United States Patent

Nakagawa

[11] Patent Number: 6,120,160
[45] Date of Patent: Sep. 19, 2000

[54] ILLUMINATING APPARATUS

[76] Inventor: Toshiaki Nakagawa, 30, Matsugaoka, Kanagawa-ku, Yokohama-shi, Kanagawa-ken, Japan

[21] Appl. No.: 09/212,526
[22] Filed: Dec. 16, 1998

[30] Foreign Application Priority Data

Dec. 24, 1997 [JP] Japan .................................. 9-366471

[51] Int. Cl.$^7$ .................................................... G09F 13/04
[52] U.S. Cl. .............................. 362/97; 362/84; 362/260; 362/293; 40/543
[58] Field of Search ................................ 362/97, 84, 293, 362/260; 40/543, 542, 581, 444

[56] References Cited

U.S. PATENT DOCUMENTS

| | | | |
|---|---|---|---|
| 4,998,804 | 3/1991 | Horiuchi ..................................... | 349/64 |
| 5,009,019 | 4/1991 | Erlendsson et al. ....................... | 40/541 |
| 5,396,406 | 3/1995 | Ketchpel ................................... | 362/27 |

FOREIGN PATENT DOCUMENTS

| | | |
|---|---|---|
| 0 706 006 | 4/1996 | European Pat. Off. . |
| 2 600 451 | 12/1987 | France . |
| 2 204 981 | 11/1988 | United Kingdom . |
| 89/02637 | 3/1989 | WIPO . |
| 89/11714 | 11/1989 | WIPO . |

Primary Examiner—Alan Cariaso
Assistant Examiner—Ronald DelGizzi
Attorney, Agent, or Firm—Flynn, Thiel, Boutell & Tanis, P.C.

[57] ABSTRACT

An illuminating apparatus is capable of correcting color discrepancies of a color positive film. The color positive film can be an advertising signboard displaying body or as a medical diagnosis displaying body displaying in a same tone of color as the original object. The illuminating apparatus is constructed so that a color positive film made as an advertising signboard displaying body, etc. is set on a rear surface of a transparent plate disposed on a front opening portion of a box. A fluorescent plate formed by blending powder fluorescent materials emitting blue, green and red lights with acryl resin is placed on the rear side of the transparent plate. At least one ultraviolet lamp and at least one reflecting plate are arranged further behind the fluorescent plate.

5 Claims, 2 Drawing Sheets

ILLUMINATING APPARATUS

FIELD OF THE INVENTION

The present invention relates to an illuminating apparatus and more specifically, it relates to an illuminating apparatus useful for illuminating a color positive film or the like made in technical fields of advertising signboards, medical diagnosis, etc.

DESCRIPTION OF THE PRIOR ART

Heretofore color positive films having a predetermined size (a color negative film made by imaging an object by means of a camera is used as an original) are made through a well-known process starting from an original. Color positive films are widely utilized in technical fields of advertising signboards, medical diagnosis, etc.

Strictly speaking, there are some color discrepancies between the color positive film made finally through the process and the object.

For example, in an apparatus for an advertising signboard, a color positive film made as an advertising signboard displaying body is disposed before a front opening of a box. An advertising image in the color positive film is displayed by illuminating the color positive film with light coming from a light source such as a fluorescent lamp, etc. disposed behind the film. In particular cases where the object of the image of an advertising display is perishable foods such as slices of fresh tuna, lobster, crab, etc., freshness of the foods is significantly damaged by color discrepancies between the displayed image and the object so that the advertising signboard has a negative effect contrarily to initial intention.

On the other hand, in medical examination, if color of blood flow in an affected part is not clearly displayed, e.g. when a state of the affected part is diagnosed while illuminating a color positive film made by imaging the affected part by means of a gastrocamera, it can cause an erroneous diagnosis.

SUMMARY OF THE INVENTION

The present invention has been made for solving the problem described above. A main object is to provide an illuminating apparatus to correct the color discrepancies produced when a color positive film comprising an advertising signboard displaying body or a medical diagnosis displaying body is illuminated with light. The illuminating light displays the image with a clear tone of color exactly identical to that of the object.

In order to achieve the above object, an illuminating apparatus according to the present invention comprises a fluorescent plate made of fluorescent materials emitting three different colors, blue, green and red; and at least an ultraviolet lamp illuminating the fluorescent plate to make the fluorescent materials in the fluorescent plate emit light.

DESCRIPTION OF THE PREFERRED EMBODIMENTS

Figure 1:
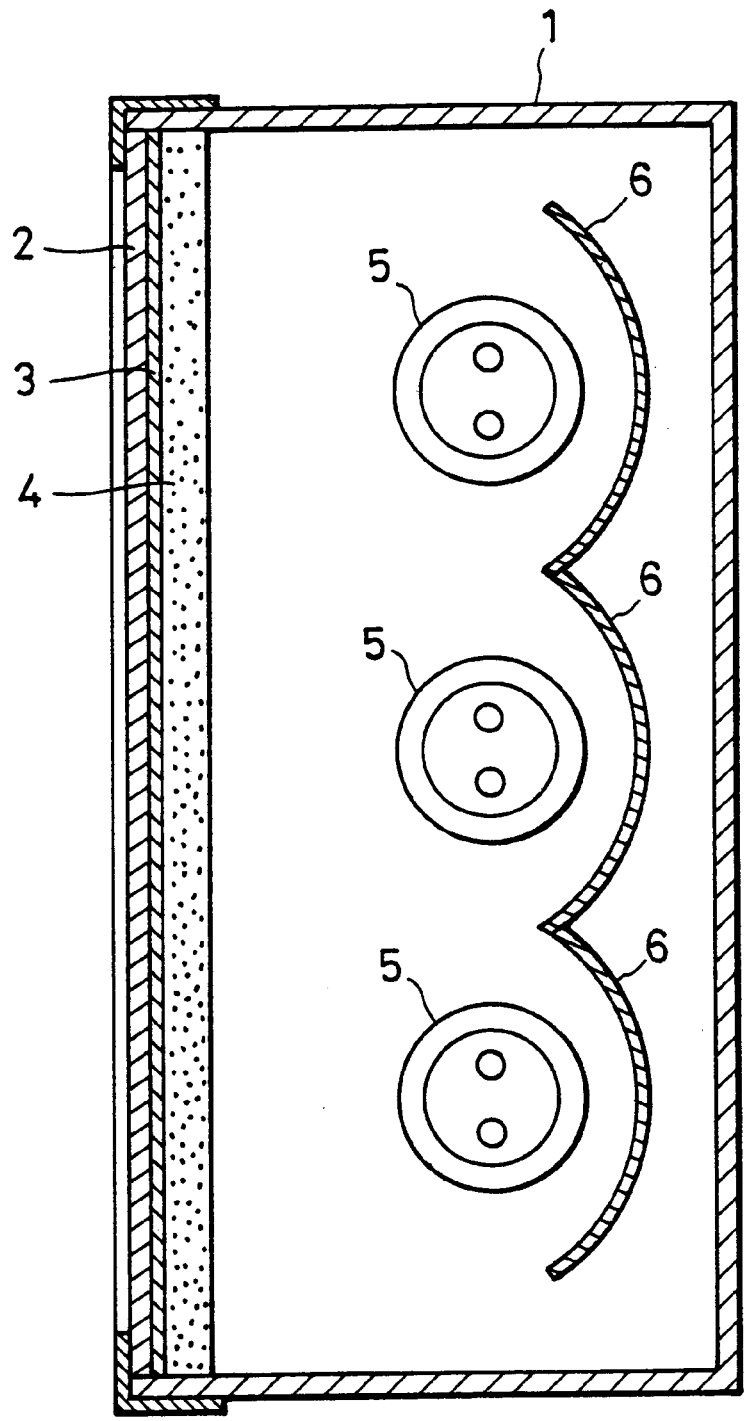
FIG. 1 is a cross-sectional view of an advertising signboard apparatus, which is an embodiment of the present invention.
Figure 2:
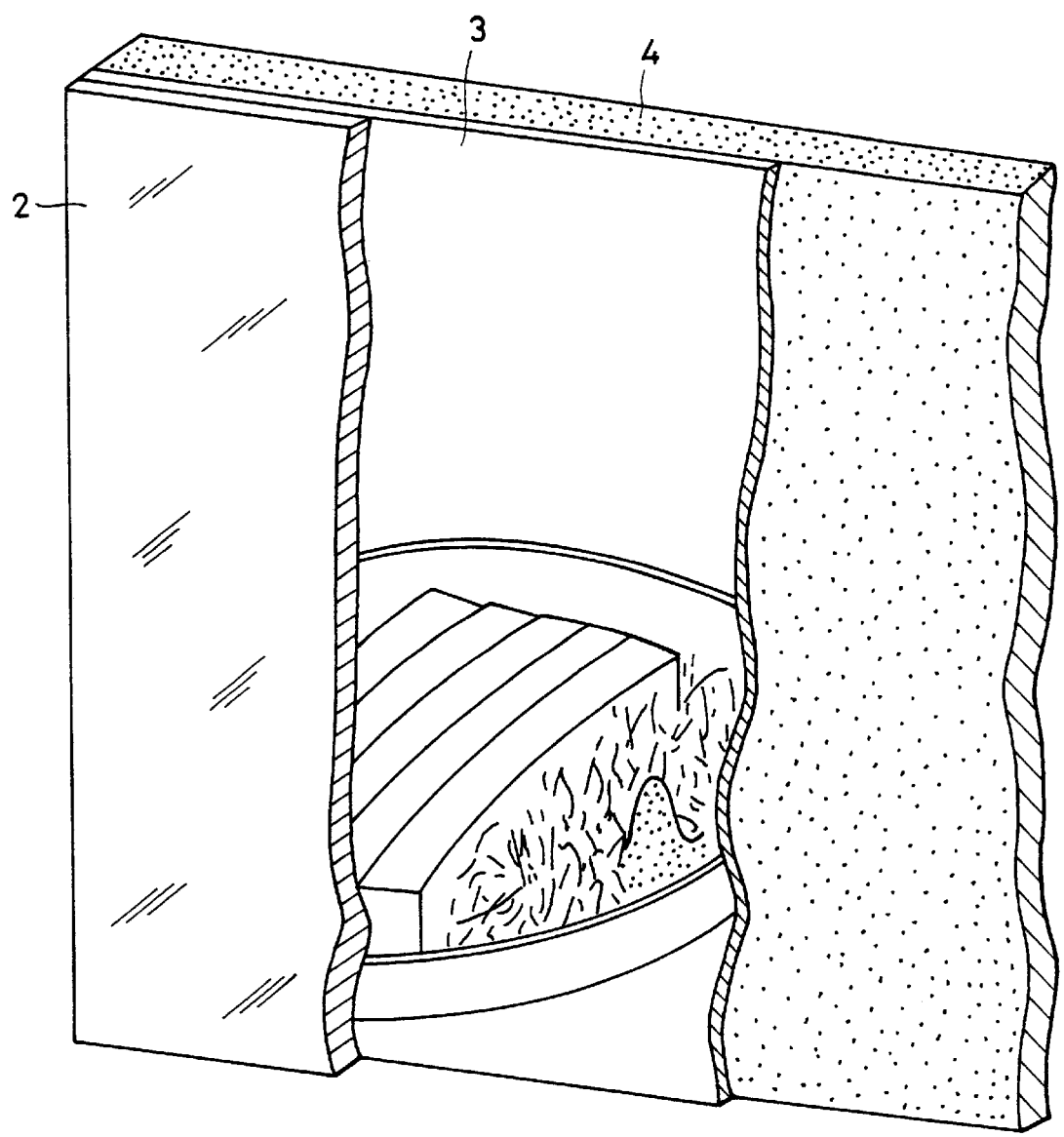
FIG. 2 is a perspective view of a part of an advertising signboard displaying body.

In a preferred mode of realization of the present invention, as indicated in FIGS. 1 and 2, a color positive film 3 made as an advertising signboard displaying body is disposed on the rear side of a transparent plate 2 arranged at a front opening portion of a box 1. On the rear side of the color positive film there is disposed a fluorescent plate 4 made of acryl resin with which fluorescent materials emitting blue, green and red lights are blended. At least one ultraviolet lamp 5 and at least one reflecting plate 6 are disposed behind the fluorescent plate 4.

FIGS. 1 and 2 show an embodiment, in which an advertising signboard apparatus is illuminated by an illuminating apparatus according to the present invention. Transparent plate 2 is made of synthetic resin and disposed at the opening portion of the box.

The color positive film 3 is disposed in surface-to-surface relationship on the rear side thereof as shown in FIG. 1.

The fluorescent plate 4 is fabricated by blending e.g. powder acryl resin serving as a coupling agent with blue, green and red light emitting powder fluorescent materials and by forming them in a plate-shape.

As fluorescent materials there are pigments and dyes. However, from the point of view of resistance to climate, it is preferable to use pigments.

UV fluorescent lamps, mercury lamps, arc lamps, sterilizing lamps, etc. are conventionally well-known and can be used as the ultraviolet lamp 5. However, it is preferable to use ultraviolet lamps emitting light having a wavelength in a region near 365 nm, which is suitable for making the fluorescent materials contained in the fluorescent plate 4 emit fluorescence. Such lamps also contain no wavelengths harmful to human eyes.

In the apparatus for an advertising signboard constructed as described above, ultraviolet light emitted by the ultraviolet lamp 5 is projected toward the fluorescent plate 4. When the fluorescent materials blended in the fluorescent plate 4 are irradiated with ultraviolet light, then the blue, green and red lights are emitted simultaneously as fluorescence. According to the color addition principle of the three primary colors, blue, green and red emitted lights combine to form white light, which is projected to the color positive film 3 on the front side of the fluorescent plate 4.

In this case the color positive film 3 itself, irradiated with the white light, acts as a filter. That is, red light in the white light passes through parts developed in red color. The parts in red color do not allow the other colors, i.e. blue light and green light, to pass through. Parts developed in blue color and those developed in green color act analogously.

Owing to the action of the filter, correction of the color discrepancies is effected for the parts developed in red color, parts developed in blue color and parts developed in green color in the color positive film 3 by fluorescent lights of the respective colors passing therethrough. In this way, the color positive film is corrected to the same tone of color as the object to be displayed.

In the fluorescent plate 4, acryl resin is used as a coupling agent for the powder fluorescent materials. Vinyl chloride resin, polyethylene resin, etc. may be used for this coupling agent. Any other material can be arbitrarily selected to be used therefor, if it does not prevent fluorescent light emission of the fluorescent materials.

The same effect can be obtained by using a fluorescent plate obtained by blending the fluorescent materials emitting blue, green and red lights with a coupling agent. The blended material is applied on a surface e.g. of an acryl resin plate in a multilayered structure. However, the fluorescent plate thus constructed has a drawback that the applied multilayer is easily damaged. On the contrary, the fluorescent plate used in the present embodiment is advantageous in that it can be easily fabricated and that it can be obtained at a low cost.

The embodiment described above is an example, in which the present invention is realized for illuminating an advertising signboard. Since color of blood flow, etc. in an affected part can be clearly displayed by placing a color positive film of the affected part made for medical diagnosis instead of the color positive film made as the signboard displaying body, it is possible to contribute significantly to an increase in precision of diagnosis of the affected part on the color positive film.

Further, in cases where the illuminating apparatus according to the present invention is used as a backlight for a liquid crystal color display (liquid crystal display panel), an excellent effect can be obtained for clarifying liquid crystal display color.

As explained in detail above, according to the present invention, it is possible to provide an illuminating apparatus capable of exhibiting an excellent effect for correcting color discrepancies in a color positive film, etc. The apparatus can be made as an advertising signboard displaying body or a medical diagnosis displaying body or for clarifying a liquid crystal color display.

What is claimed is:

1. An illuminating apparatus comprising:
    a fluorescent plate containing fluorescent materials emitting blue, green and red light;
    at least one ultraviolet lamp irradiating said fluorescent plate with ultraviolet light so that said fluorescent materials emit fluorescence; and
    a color positive film irradiated with white light from said fluorescent plate, said color positive film having a color image and color filter function.

2. An illuminating apparatus according to claim 1, wherein the color image of said color positive film comprises an advertising signboard displaying body.

3. An illuminating apparatus according to claim 1, wherein the color image of said color positive film is for medical diagnosis.

4. An illuminating apparatus comprising:
    a fluorescent plate containing fluorescent materials emitting blue, green and red light;
    at least one ultraviolet lamp irradiating said fluorescent plate with ultraviolet light so said fluorescent materials emit fluorescence; and
    a color positive film in surface-to-surface contact with a first side of said fluorescent plate and irradiated with white light from said fluorescent plate, said color positive film having a color image for display.

5. An illuminating apparatus according to claim 4, including an outwardly facing transparent plate in surface-to-surface contact with a second opposing side of said color positive film.

* * * * *